United States Patent
Peng et al.

(10) Patent No.: US 6,251,822 B1
(45) Date of Patent: Jun. 26, 2001

(54) METHOD OF MAKING ACTIVATED CARBON DERIVED FROM PITCHES

(75) Inventors: Y. Lisa Peng, Big Flats; Jimmie L. Williams, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/348,305

(22) Filed: Jul. 7, 1999

Related U.S. Application Data

(60) Provisional application No. 60/093,340, filed on Jul. 20, 1998.

(51) Int. Cl.[7] .................................................. C01B 31/08
(52) U.S. Cl. ........................................... 502/423; 502/427
(58) Field of Search ....................... 423/445 R; 502/417, 502/423, 427, 432, 152, 180, 182, 183, 184, 185

(56) References Cited

U.S. PATENT DOCUMENTS

| | | | |
|---|---|---|---|
| Re. 29,101 | * 1/1977 | Amagi et al. ................... 423/445 R |
| 3,885,977 | 5/1975 | Lachman et al. ...................... 501/80 |
| 4,127,691 | 11/1978 | Frost .................................. 428/116 |
| 4,758,272 | 7/1988 | Pierotti et al. ......................... 75/246 |
| 4,992,233 | 2/1991 | Swaroop et al. ......................... 419/2 |
| 5,427,601 | 6/1995 | Harada et al. ......................... 75/235 |
| 5,736,030 | * 4/1998 | Tsuchitani et al. .................... 208/45 |
| 5,820,967 | 10/1998 | Gadkaree ............................. 428/116 |

OTHER PUBLICATIONS

U.S. application No. 08/859,874, Gadkree filed May 21, 1997.

U.S. application No. 09/115,462, Gadkaree filed Jul. 14, 1998.

* cited by examiner

*Primary Examiner*—Stuart L. Hendrickson
(74) *Attorney, Agent, or Firm*—Anca C. Gheorghiu; L. Rita Herzfeld

(57) ABSTRACT

A method of making activated carbon of various pore size distributions involves an providing oxidized pitch, carbonizing the pitch when the softening point of the pitch is less than about 250° C., and activating the pitch to produce activated carbon. A catalyst metal can be included with the pitch to produce mesoporosity in the activated carbon.

15 Claims, No Drawings

METHOD OF MAKING ACTIVATED CARBON DERIVED FROM PITCHES

This application claims the benefit of U.S. Provisional Application No. 60/093,340, filed Jul. 20, 1998, entitled "Method of Making Activated Carbon Derived from Pitches", by Peng et al.

This invention relates to a method of making various pore size distributions in the micropore range by a method that involves oxidizing a carbon precursor in the form of pitch, followed by activating. Mesoporous carbon is made from pitch by combining the pitch with selected metal catalysts.

BACKGROUND OF THE INVENTION

Activated carbon has found use in various applications such as air and water purification, hydrocarbon adsorption in automotive evaporative emission control and cold start hydrocarbon adsorption, etc. Microporous structure carbon (pore diameter less than 20 angstroms and BET surface area of 1000–3000 m$^2$/g) are suitable for many applications such as gas phase adsorption e.g. light hydrocarbons and H$_2$S, while other applications require larger size of pores in the carbon for optimum adsorption and/or catalytic activity. For example, removal of larger molecular size pollutants such as humine, protein, etc. in liquid phase, in addition to conventional gaseous pollutants, such as hydrocarbons, or certain kinds of pesticides require specific surface properties and pore size distributions. When catalytic or chemical reaction is limited by mass and heat transfer, larger size of pores in the carbon is preferred. Mesoporosity in the carbon is sometimes also required for adequate catalyst loading and dispersion.

Activated carbon monoliths, whether in the form of a coating on a substrate, or a shaped structure of activated carbon, have found use in various applications especially where durability and low pressure drop is required, such as in some chemical reactions using strongly acidic or basic solvents or other corrosive media.

Therefore it would be an advancement in the art to have a method of making activated carbon, especially in the form of honeycombs with various pore sizes to match the particular applications.

The present invention discloses such a method in which activated carbon having microporosity or mesoporosity is produced from pitch.

SUMMARY OF THE INVENTION

In accordance with one aspect of the invention, there is provided a method of making activated carbon of various pore size distributions that involves providing an oxidized pitch, carbonizing the pitch when the softening point of the pitch is less than about 250° C., and activating the pitch to produce activated carbon. A catalyst metal can be included with the pitch to produce mesoporosity in the activated carbon.

DETAILED DESCRIPTION OF THE INVENTION

This invention relates to making microporous and mesoporous activated carbon using pitch as a carbon precursor. The resultant microporous carbon is useful for many adsorption applications in both gas and liquid phases. The resultant mesporous carbon is useful for carbon catalyst support for chemical processing, and in liquid phase applications such as filtration of dyes, proteins, vitamins, humic acid, etc.

By microporous carbon is meant that at least about 80% of the pore volume has a pore diameter less than 20 angstroms and BET surface area of 1000–3000 m$^2$/g.

By mesoporous carbon according to this invention is meant that at least 50% of the total pore volume is in the range of 20 to 500 angstroms and no more than 25 percent pore volume is in the range of large pores (>500 angstroms).

The starting carbon sources of this invention are a group of thermoplastic carbon forming materials, defined in this invention as pitch, including carbonaceous residues that are derived from processing petroleum, coal, or other fossil hydrocarbon sources, e.g petroleum pitches, and coal tar pitches; and synthetic pitches such as those derived from pyrolysis of naphthalene and polyvinychloride. Pitches are composed of condensed aromatic structures with varying degrees of substitution. They are thermoplastic, meaning that they have glass transition temperatures at either below or above room temperatures.

It is preferred that pitches of lower molecular weights and low softening points, such as viscous pitch or pitches having softening point less than 40° C. be used for coating applications. It is preferred that pitches with higher softening points (such as extruded solid pellets) having softening points higher than about 40° C., or preferably higher than about 100° C., be used for shaping applications.

The advantages of using pitch to make activated carbon versus other precursors such as thermosetting resins as phenolic resins are: (1) Carbon yields from pitches are much higher than from other sources such as thermosetting resins as phenolic resins. Typical carbon yields are 90% or greater. (2) The product is strong and experiences considerably less shrinkage during processing. (3) The raw materials and processing are both more cost effective than that with resins.

At some point before carbonization or activation, the pitch is oxidized to render it infusible. The oxidation can be done at about 200–300° C. in air for 1 to 5 hours. There is normally about 6–12% weight gain (based on the amount of carbon forming precursor) during oxidation because of addition of oxygen to the structure. The oxidation should be carried out as completely as possible to form a highly crosslinked structure.

One useful method of making the activated carbon derived from pitch is to coat an inorganic substrate such as a honeycomb with a coating suspension or solution of the pitch. The pitch is pre-dissolved in a suitable solvent such as hexane, toluene, tetrahydrofuran, etc. Choice of a solvent depends essentially on the nature of the pitch. Also it must be compatible with other components in the process.

The substrate has an outer surface from which pores extend into the substrate. The coating penetrates into and is distributed throughout these pores as a coating thereon.

In its most useful form the monolithic substrate has means for passage of a fluid stream therethrough, e.g., a network of pores communicating from the outside to the inside, and/or through channels extending from one end of the monolith to the other for passage of the fluid stream into one end and out through the other end.

The substrate must have enough strength to function in the application and be capable of withstanding the heat-treating temperature experienced in forming the activated carbon coating.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

Suitable porous substrate materials include ceramic, glass ceramic, glass, metal, clays, and combinations thereof. By combinations is meant physical or chemical combinations, e.g., mixtures, compounds, or composites.

Some materials that are especially suited to the practice of the present invention, although it is to be understood that the invention is not limited to such, are those made of cordierite, mullite, clay, magnesia, and metal oxides, talc, zircon, zirconia, zirconates, zirconia-spinel, magnesium aluminosilicates, spinel, alumina, silica, silicates, borides, aluminosilicates, eg., porcelains, lithium aluminosilicates, alumina silica, feldspar, titania, fused silica, nitrides, borides, carbides, eg., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are herein incorporated by reference as filed.

Suitable metallic materials are any metal or alloy or intermetallic compound that provides durable structural service, and does not soften below about 600° C. Particularly useful are alloys which are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders for forming substrates are disclosed in U.S. Pat. Nos. 4,992,233, 4,758,272, and 5,427,601 which are herein incorporated by reference as filed. U.S. Pat. Nos. 4,992,233 and 4,758,272 relate to methods of producing porous sintered bodies made from metal powder compositions of Fe and Al with optional additions of Sn, Cu, and Cr. U.S. Patent 5,427,601 relates to porous sintered bodies having a composition consisting essentially of in percent by weight about 5 to 40 Cr, about 2 to 30 Al, 0 to about 5 of special metal, 0 to about 4 of rare earth oxide additive and the balance being iron group metal and unavoidable impurities, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanide, Zr, Hf, Ti, Si, and B, with optional additions of alkaline earths, Cu, and Sn.

The substrate is preferably a honeycomb or matrix of thin walls forming a multiplicity of open-ended cells extending between the ends of the honeycomb.

Generally honeycomb cell densities range from 235 cells/$cm^2$ (about 1500 cells/$in^2$) to 1 cell/$cm^2$ (about 6 cells/$in^2$). Some examples of commonly used honeycombs in addition to these, although it is to be understood that the invention is not limited to such, are about 94 cells/$cm^2$ (about 600 cells/$in^2$), about 62 cells/$cm^2$ (about 400 cells/$in^2$), or about 47 cells/$cm^2$ (about 300 cells/$in^2$), and those having about 31 cells/$cm^2$ (about 200 cells/$in^2$). Typical wall thicknesses are for example, about 0.15 mm for about 62 cells/$cm^2$ (about 400 cells/$in^2$) honeycombs. Wall (web) thicknesses range typically from about 0.1 to about 1.5 mm. The external size and shape of the body is controlled by the application.

Cordierite honeycombs are especially preferred substrates.

The contacting is done by any method suitable to bring the pitch solution in intimate contact with the inorganic substrate. Exemplary methods of contacting include dipping the substrate in the solution or spraying the solution directly on the substrate.

Another useful method of making the activated carbon derived from pitch is to shape a mixture of the pitch, binders and/or fillers, and forming aids, such as by extrusion.

Some binders that can be used are plasticizing temporary organic binders such as cellulose ethers. Some typical cellulose ethers are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred.

Some fillers that are suited include both natural and synthetic, hydrophobic, and hydrophilic, fibrous and nonfibrous, carbonizable and non-carbonizable fillers.

For example some natural fillers are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, etc. Some synthetic materials are regenerated cellulose, rayon fabric, cellophane, etc.

Some examples of carbonizable fillers that are especially suited for pitch batches are cellulose, cotton, wood, and sisal, or combinations of these, all of which are preferably in the form of fibers.

Some inorganic fillers that can be used are oxygen-containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers.

Organic fillers provide additional support to the shaped structure and introduce wall porosity on carbonization because in general they leave very little carbon residue. Some organic fillers are polyacrylonitrile fibers, polyester fibers (flock), nylon fibers, polypropylene fibers (flock) or powder, acrylic fibers or powder, aramid fibers, polyvinyl alcohol, etc.

Some binders and fillers that are especially suited are described in U.S. Pat. No. 5,820967 filed May 20, 1996. That application is herein incorporated by reference.

Some forming e.g. extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder.

Activated carbons that go through conventional carbonization and activation process tend to be microporous, i.e., have a major fraction of pores at less than about 20 angstroms and surface areas at least 1000 $m^2/g$. In order to generate mesoporous activated carbon, special manipulation of the process chemistry has to be done.

In order to produce mesoporosity, various catalyst metal additives can be added to the pitch and processed as described above.

For example, for mesoporosity, the metal additive can be alkali, alkaline earth, transition, rare earth, and/or noble metal. Advantageously, the catalyst metals are Pt, Pd, Rh, Ag, Au, Fe, Re, Sn, Nb, V, Zn, Pb, Ge, As, Se, Co, Cr, Ni, Mn, Cu, Li, Mg, Ba Mo, Ru, Os, Ir, Ca, Y, Yb, or combinations of these.

When metal catalysts are present in the carbon matrix, topographical effects of surface etching, channeling and etch pitting are induced by each individual metal additive during activation, depending on their own physical and chemical properties, carbon structures, and reaction conditions. To selectively generate desirable mesoporous activated carbon, these three actions are coordinated to provide desired pore size. Channeling and pitting provide a chance to produce pores, and surface etching provides a chance for pore enlargement.

The metal catalyst is preferably in the form of a precursor or compound e.g. organic or inorganic salt of a catalyst metal, which decomposes to the catalyst metal or catalyst metal oxide on heating such as sulfates, nitrates, etc. Metal compound, preferably finely dispersed using a small amount of organic solvent, is preferred to the elemental form because metal powder tends to form larger grains of graphitic regions instead of the favored opposite effect. Examples of compounds are oxides, chlorides, (except alkali or alkaline earths) nitrates, carbonates, sulphates, complex ammonium salts, etc., and organic compounds e.g., organometallic compounds. In some cases organic forms of the metal are especially suited because the bulky organic structure introduced to the pitch is thermally set after oxidation and may help form more porosity when these structures are removed during carbonization. Therefore, more catalysts are exposed to the surface for additional pore size engineering during activation step.

Rare earth metal complexes such as yttrium cyclopentadienyl, yttrium acetylacetonate, and/or ytterbium acetylacetonate, are particularly useful.

Other useful catalyst metal compounds are cobalt acetylacetonate, nickel acetylacetonate, iron cyclopentadienyl, chloroplatinic acid, and/or platinum acetylacetonate.

The amount of metal catalyst used in the invention depends on the type or activity of the metal catalyst, as well as the final porosity and pore size distribution desired, but is no greater than about 3% by weight, typically about 0.01% to 3% by weight based on the amount of pitch used. Typically, the final activated carbon can contain from 100 ppm to 10,000 ppm of catalyst metal based on the final activated carbon. The amount of metal addition significantly affects the final pore structures generated. Adding too much metal, however, will cause significant increase in the metal sintering rate. The sintered particle tends to block the pores and form the so-called bottle-necked pores. Also, when sintering happens, the activity of the catalysts drops and even deactivates. For the current invention, the catalyst metal concentration should ideally be much lower than 1 wt. %, based on the amount of pitch that is used. Usually, the lower the catalyst metal required the better.

Once coating or shaping is done, the resulting body is dried to remove the solvent. The drying process is physical and is easy to control. Compared to curing that is done with for example thermosetting resins, it is less likely to form microcracking; and weight loss is considerably less. The solvent can be recycled and used again.

The pitch is oxidized normally after drying, as described previously.

Depending on the source of pitch used, the oxidized bodies may or may not be carbonized. For example, when using a high softening point pitch, that is, greater than about 250° C., carbonization is usually optional. However, when the softening point of the pitch is less than about 250° C., carbonization is needed to enrich the carbon content. Carbonization is at about 600–1000° C. for typically ½ hour to 2 hours in reducing atmosphere (nitrogen, argon, helium, etc.). The purpose of the carbonization is to remove volatile hydrocarbons and form a carbon-rich residue. It is preferred, for the purpose of the invention, that the carbonization is done in a short period of time, especially for forming mesoporous activated carbon. Carbonization for prolonged periods of time will cause considerable structural reorganization. Anisotropic graphitic phases begin to aggregate and precipitate from the isotropic matrix. This will result in an non-reactive carbon during activation.

The pitch bodies are then activated according to standard methods but preferably, and especially to produce mesoporosity, in $CO_2$ or steam, preferably steam, at typically about 600–1000° C. Higher temperature and shorter activation times are preferred, similar to the carbonization process.

The metals can be removed from the resulting mesoporous activated carbon body, or they can remain if they are needed in catalytic operations, etc. Removal is done by treating the body with an agent in liquid phase that will leach out the metal into solution and the metal will then be washed away. Such agents are acids and bases, such as nitric, which will leach out most metals. Hydrochloric acid instead of nitric acid works effectively for metals, which form coordination compounds with the chloride such as platinum. Acetic acid can be used for species that readily form acetates. If the carbon surface is oxidized, as it may be if nitric acid or another oxidizing agent is used, it can be subjected to a subsequent treatment at elevated temperatures in nitrogen or hydrogen to produce a reduced surface.

The metal removal can also be done by treating the body with heat or an agent in gas phase that will form volatile metallic compounds and the formed volatile compounds will release into gas phase by heating. Such agents are carbon monoxide, hydrogen, and chlorine, etc. depending on nature of metal catalysts. Alkali metal can be directly removed from carbon body by heat treatment due to its high volatility. Metals like nickel, iron, colbalt, etc. can be removed through their volatile carbonyl compounds formed with carbon monoxide.

To more fully illustrate the invention, the following non-limiting examples are presented. All parts, portions, and percentages are on a weight basis unless otherwise stated.

EXAMPLE 1

A coal tar pitch from Coopers Creek Chemical 0250, having a specific gravity of 1.2 g/cc and initial boiling point of 218° C. was used as the carbon source. Ceramic honeycombs having 50% open porosity, 400 cell per square inches and 12 mil web thickness was used for obtaining the activated carbon coating. The coal tar pitch is mixed with a small amount of methylene chloride to adjust its viscosity to 100 cps. The ceramic honeycomb is dipped coated into the pitch solvent solution and dried in oven at 70° C. Multiple dippings were done to achieve a carbon precursor loading of 35% on the ceramic honeycomb. Dried honeycombs were then oxidized in air at 250° C. for 2 hours and then carbonized in nitrogen at 700° C. for half an hour and activated in steam at 900° C. for 1 hour. The resulting microporous activated carbon honeycomb has a surface area of 1200 $m^2/g$, based on the amount of carbon. It is suitable for gas phase adsorption applications. It has a butane adsorption capacity of 50 mg/g carbon for an 80 ppm butane-containing dilute nitrogen stream. The honeycomb has a carbon content of 20%.

EXAMPLE 2

A synthetic naphthalene pitch under the name of ARA24 produced from the Mitsubishi Gas Chemical Company is used as carbon source for shaping honeycombs. This pitch has a softening point of around 280° C. Fine powdered materials of the ARA24, cordierite, methocel, and polyester flock were mixed up according to the following composition: 63.5% ARA24, 12.7% cordierite, 12.7% Methocel® and 6.4% polyester flock. About 4.7% of phenolic resole resin of around 100 cps is then added as organic filler. Additional water up to 47% of the total weight of the batch is added to adjust the rheology of the batch to make an extrudable batch. The mixed batch is milled in the standard milling operations to obtain a plasticized extrudable batch. The batch is then extruded into cellular parts with 400 cpsi and 12 mil web thickness. The parts are dried overnight at 120° C. and oxidized in a tubular furnace for 3 hours at 250° C. The resulting oxidized pitch honeycomb is then steam activated at 900° C. for 0.5 hr. The resulting activated carbon honeycomb has a surface area around 1300 $m^2/g$. It has high butane adsorption capacity of 65 mg/g carbon for 80 ppm dilute butane vapor. The honeycomb material has a carbon content of 50%.

EXAMPLE 3

Powdered ARA24 is mixed with additional binders, the amounts of which are based on the total weight of the ARA24. The binders are 2% polyvinylalcohol Airvol 205S from Air Products, 6% Methocel® A4M from Dow Chemical and 10% epoxy from Shell Chemical with curing agent in. Water of about 50% is also added to adjust the final rheology of the batch. Aqueous epoxy dispersion is added. The materials are mixed in a muller to obtain a plasticized batch. The plasticized batch is then extruded into cellular shape of 400 cell per square inch and 12 mil web thickness. The drying, carbonizing and activating processes are similar to Example 2. The resulting carbon honeycomb has similar surface area and similar butane adsorption capacity as Example 2, but with about 100% carbon content.

EXAMPLE 4

About 3% of yttrium cyclopentadienyl ($Y(C_5H_5)_3$) is dissolved into a small amount of methylene chloride, and then mixed into the methylene chloride solution of Coopers Chemical 0250 coal tar pitch. A ceramic honeycomb is then dip-coated and processed in a manner similar to Example 1. Carbonization is done at about 800° C. for about ½ hour in $N_2$. The resulting activated carbon honeycomb has a surface area of 300 $m^2/g$ and 95% of the pore volume is in the mesopore range of 20 to 500 angstrom.

EXAMPLE 5

A typical coating procedure are illustrated as follows. A pitch material, for example, 0250 from Coopers Creek Chemical, is first diluted with a suitable amount of solvent, such as methlene chloride, to obtain a viscosity of 200 to 300 cps. Metal catalysts, for example, cobalt acetalacetonate, of 2% based on pitch amount is also dissolved into the solvent when the desired final carbon is mesoporous. The mixture is then dip coated using a conventional cordierite having 50% open porosity. The pitch containing honeycomb is dried to remove the solvent. The procedure is repeated a few times to achieve the desired amount of loading on the cordierite substrate. The dried honeycomb is oxidized in air at 200° C. to render it infusible. The resulting oxidized pitch honeycomb is a highly corsslinked three dimensional network of condensed aromatic rings. The honeycomb is then carbonized at 700° C. in nitrogen for half an hour and then activated at 900° C. for half an hour. Microporous or mesoporous activated carbon is obtained, depending on the absence or presence of the metal catalyst.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making activated carbon, the method comprising:
    a) providing an oxidized pitch and adding thereto a catalyst metal in an amount of 2% to about 3%;
    b) carbonizing the pitch when the softening point of the pitch is less than about 250° C.; and
    c) activating the pitch to produce activated carbon.
2. A method of claim 1 wherein the pitch is coated onto a monolithic substrate.
3. A method of claim 1 wherein the pitch is combined with binders and shaped into a body.
4. A method of claim 3 wherein the pitch has a softening point of greater than about 40° C.
5. A method of claim 3 wherein the shaping is done by extrusion.
6. A method of claim 3 wherein the pitch is combined with binder and extruded into a honeycomb.
7. A method of making activated carbon supported onto a monolith substrate, the method comprising:
    a) providing a monolith substrate;
    b) providing a pitch;
    c) coating the monolith substrate with the pitch;
    d) oxidizing the pitch;
    e) carbonizing the pitch when the softening point of the pitch is less than about 250° C.; and
    f) activating the pitch to produce activated carbon.
8. A method of claim 7 wherein the pitch has a softening point less than about 40° C.
9. A method of claim 7 wherein the substrate is a honeycomb.
10. A method of making activated carbon, the method comprising:
    a) providing an oxidized pitch which includes a catalyst metal, wherein the catalyst metal is a rare earth metal organic compound;

b) carbonizing the pitch when the softening point of the pitch is less than about 250° C.; and c) activating the pitch to produce activated carbon.

11. A method of clam 10 wherein the catalyst metal is provided as a rare earth metal organic compound selected from the group consisting of yttrium cyclopentadienyl, yttrium acetylacetonate, ytterbium acetylacetonate, and mixtures thereof.

12. A method of making activated carbon, the method comprising:

a) providing an oxidized pitch, wherein the pitch has a softening point less than about 40° C. and adding thereto a catalyst metal in an amount of 2% to about 3%;

b) carbonizing the pitch when the softening point of the pitch is less than about 250° C.; and c) activating the pitch to produce activated carbon.

13. A method of making activated carbon, the method comprising:

a) providing an oxidized pitch and adding thereto a catalyst metal in an amount of 2% to about 3%, wherein the catalyst is a compound selected from the group consisting of alkali metal, alkaline earth metal, transition metal, rare earth metal, noble metal, and mixtures thereof;

b) carbonizing the pitch when the softening point of the pitch is less than about 250° C.; and c) activating the pitch to produce activated carbon, d) coating the pitch onto a monolithic substrate, wherein the substrate is a honeycomb.

14. A method of claim 13 wherein the catalyst metal is provided as a rare earth metal organic compound selected from the group consisting of yttrium cyclopentadienyl, yttrium acetylacetonate, ytterbium acetylacetonate, and mixtures thereof.

15. A method of claim 13 wherein the catalyst metal is selected from the group consisting of cobalt acetylacetonate, nickel acetylacetonate, iron cyclopentadienyl, chloroplatinic acid, platinum acetylacetonate, and mixtures thereof.

* * * * *